(12) United States Patent
Jackson et al.

(10) Patent No.: US 11,505,506 B2
(45) Date of Patent: Nov. 22, 2022

(54) SELF-HEALING ENVIRONMENTAL BARRIER COATING

(71) Applicant: United Technologies Corportion, Farmington, CT (US)

(72) Inventors: Richard Wesley Jackson, Groton, CT (US); James T. Beals, West Hartford, CT (US); Tania Bhatia Kashyap, West Hartford, CT (US); Wayde R. Schmidt, Pomfret Center, CT (US); Paul Sheedy, Bolton, CT (US); Xia Tang, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1134 days.

(21) Appl. No.: 15/998,730

(22) Filed: Aug. 16, 2018

(65) Prior Publication Data

US 2020/0056488 A1  Feb. 20, 2020

(51) Int. Cl.
  *C04B 35/14* (2006.01)
  *C04B 35/622* (2006.01)
  (Continued)

(52) U.S. Cl.
  CPC .............. *C04B 41/85* (2013.01); *C04B 35/14* (2013.01); *C04B 35/62222* (2013.01);
  (Continued)

(58) Field of Classification Search
  CPC ......... F01D 5/288; F01D 5/284; C04B 41/85; C04B 41/009; C04B 41/5024; C04B 41/52; C04B 41/89; C04B 25/14; C04B 25/62222; C04B 25/6303; C04B 2235/3418; C04B 2235/3895; C04B 2235/9684; F05D 2300/2102; F05D 2300/211; F05D 2300/222; F05D 2300/6033;
  (Continued)

(56) References Cited

U.S. PATENT DOCUMENTS 5,113,582 A  5/1992  Monson et al.
5,580,837 A  12/1996  Dodds et al.
(Continued)

FOREIGN PATENT DOCUMENTS

DE  102015205807 A1  10/2016
EP  1044944 A1  10/2000
(Continued)

OTHER PUBLICATIONS

Nikas, V. et al.. (2015). Strong visible light emission from silicon-oxycarbide nanowire arrays prepared by electron beam lithography and reactive ion etching. Journal of Materials Research. 30. 1-8. (Year: 2015).*
(Continued)

*Primary Examiner* — Topaz L. Elliott
(74) *Attorney, Agent, or Firm* — Bachman & LaPointe, P.C.

(57) ABSTRACT

An environmental barrier coating, comprising a substrate containing silicon; an environmental barrier layer applied to the substrate; the environmental barrier layer comprising an oxide matrix; an oxidant getter phase interspersed throughout the oxide matrix; and a self-healing phase interspersed throughout the oxide matrix.

11 Claims, 5 Drawing Sheets

(51) Int. Cl.
  *F01D 5/28* (2006.01)
  *C04B 41/85* (2006.01)
  *C04B 35/63* (2006.01)

(52) U.S. Cl.
  CPC .......... *C04B 35/6303* (2013.01); *F01D 5/284* (2013.01); *F01D 5/288* (2013.01); *C04B 2235/3418* (2013.01); *C04B 2235/3895* (2013.01); *C04B 2235/9684* (2013.01); *F05D 2220/32* (2013.01); *F05D 2240/12* (2013.01); *F05D 2240/30* (2013.01); *F05D 2300/211* (2013.01); *F05D 2300/2102* (2013.01); *F05D 2300/222* (2013.01); *F05D 2300/6033* (2013.01); *F05D 2300/611* (2013.01)

(58) Field of Classification Search
  CPC ........... F05D 2300/611; F05D 2300/15; F05D 2300/2261; F05D 2230/312; C23C 4/134; C23C 26/00
  See application file for complete search history.

(56) References Cited

U.S. PATENT DOCUMENTS

| | | | |
|---|---|---|---|
| 5,858,181 | A | 1/1999 | Jindal et al. |
| 6,117,560 | A | 9/2000 | Maloney |
| 6,210,182 | B1 | 4/2001 | Hasz et al. |
| 6,228,453 | B1 | 5/2001 | Fareed et al. |
| 6,270,852 | B1 | 8/2001 | Ulion et al. |
| 6,284,323 | B1 | 9/2001 | Maloney |
| 6,296,941 | B1 | 10/2001 | Eaton, Jr. et al. |
| 6,579,636 | B2 | 6/2003 | Oguri et al. |
| 6,730,422 | B2 | 5/2004 | Litton et al. |
| 6,924,040 | B2 | 8/2005 | Maloney |
| 7,063,894 | B2 | 6/2006 | Sun et al. |
| 7,226,672 | B2 | 6/2007 | Litton et al. |
| 7,509,735 | B2 | 3/2009 | Philip et al. |
| 7,513,955 | B2 | 4/2009 | Krüger et al. |
| 7,622,195 | B2 | 11/2009 | Schlichting et al. |
| 7,862,901 | B2 | 1/2011 | Darolia et al. |
| 7,951,459 | B2 | 5/2011 | Tang et al. |
| 7,972,657 | B2 | 7/2011 | Schlichting et al. |
| 8,039,113 | B2 | 10/2011 | Kirby et al. |
| 8,062,759 | B2 | 11/2011 | Fu et al. |
| 8,084,086 | B2 | 12/2011 | Hass et al. |
| 8,111,078 | B1 | 2/2012 | Yang et al. |
| 8,119,247 | B2 | 2/2012 | Kirby et al. |
| 8,216,689 | B2 | 7/2012 | Witz et al. |
| 8,217,087 | B1 | 7/2012 | Keller et al. |
| 8,257,559 | B2 | 9/2012 | Floyd et al. |
| 8,273,470 | B2 | 9/2012 | Kirby et al. |
| 8,287,635 | B2 | 10/2012 | Luccarelli et al. |
| 8,343,589 | B2 | 1/2013 | Kirby et al. |
| 8,357,454 | B2 | 1/2013 | Kulkarni et al. |
| 8,470,460 | B2 | 6/2013 | Lee |
| 8,512,874 | B2 | 8/2013 | Darolia et al. |
| 8,529,999 | B2 | 9/2013 | Maloney et al. |
| 8,574,721 | B2 | 11/2013 | Gero et al. |
| 8,658,255 | B2 | 2/2014 | Kirby et al. |
| 8,658,291 | B2 | 2/2014 | Kirby et al. |
| 8,663,378 | B2 | 3/2014 | Luccarelli et al. |
| 8,673,400 | B2 | 3/2014 | Kirby et al. |
| 8,940,417 | B2 | 1/2015 | Courcot et al. |
| 9,034,479 | B2 | 5/2015 | Nagaraj et al. |
| 9,126,873 | B2 | 9/2015 | Diss et al. |
| 9,387,512 | B2 | 7/2016 | Lee et al. |
| 9,428,650 | B2 | 8/2016 | Meschter et al. |
| 9,611,181 | B2 | 4/2017 | Tang et al. |
| 9,713,912 | B2 | 7/2017 | Lee |
| 9,771,811 | B2 | 9/2017 | Zhang et al. |
| 9,926,238 | B2 | 3/2018 | Louchet et al. |
| 9,938,839 | B2 | 4/2018 | Rosenzweig et al. |
| 9,951,630 | B2 | 4/2018 | Hass |
| 2002/0058107 | A1* | 5/2002 | Fareed .............. C04B 35/62844 427/255.39 |
| 2006/0099358 | A1 | 5/2006 | Raybould et al. |
| 2006/0110609 | A1 | 5/2006 | Eaton et al. |
| 2006/0115659 | A1 | 6/2006 | Hazel et al. |
| 2007/0292616 | A1 | 12/2007 | Hazel |
| 2008/0113218 | A1 | 5/2008 | Schlichting et al. |
| 2008/0187767 | A1* | 8/2008 | Tang ...................... C04B 41/89 204/192.1 |
| 2009/0155554 | A1 | 6/2009 | Gentleman et al. |
| 2009/0186237 | A1 | 7/2009 | Lee |
| 2010/0129636 | A1 | 5/2010 | Cybulsky et al. |
| 2010/0129673 | A1 | 5/2010 | Lee |
| 2010/0154422 | A1 | 6/2010 | Kirby et al. |
| 2011/0014060 | A1 | 1/2011 | Bolcavage et al. |
| 2011/0217560 | A1 | 9/2011 | Ridgeway |
| 2011/0256411 | A1* | 10/2011 | Courcot ................ C04B 41/009 428/446 |
| 2011/0281107 | A1 | 11/2011 | Gero et al. |
| 2012/0244383 | A1 | 9/2012 | Meschter et al. |
| 2013/0122259 | A1 | 5/2013 | Lee |
| 2013/0260130 | A1 | 10/2013 | Taxacher et al. |
| 2014/0065408 | A1 | 3/2014 | Strock et al. |
| 2014/0272310 | A1 | 9/2014 | Lazur et al. |
| 2015/0111063 | A1 | 4/2015 | Khan et al. |
| 2015/0118444 | A1 | 4/2015 | Lipkin et al. |
| 2015/0167141 | A1 | 6/2015 | Rozenweig et al. |
| 2015/0308276 | A1 | 10/2015 | Kleinow et al. |
| 2016/0130188 | A1* | 5/2016 | Louchet ................ C04B 41/89 428/448 |
| 2016/0160664 | A1 | 6/2016 | Luthra et al. |
| 2016/0186580 | A1 | 6/2016 | Zaleski et al. |
| 2016/0214907 | A1 | 7/2016 | Shim et al. |
| 2016/0332922 | A1 | 11/2016 | Tang et al. |
| 2017/0022113 | A1 | 1/2017 | Opila |
| 2017/0073278 | A1 | 3/2017 | Landwehr et al. |
| 2017/0121232 | A1 | 5/2017 | Nelson et al. |
| 2017/0145560 | A1 | 5/2017 | Weaver et al. |
| 2017/0335118 | A1 | 11/2017 | Tang et al. |
| 2017/0342539 | A1 | 11/2017 | Sato et al. |
| 2018/0170811 | A1* | 6/2018 | Osada ..................... F01D 5/284 |
| 2018/0305821 | A1 | 10/2018 | Wan et al. |
| 2018/0347049 | A1 | 12/2018 | Oboodi et al. |
| 2018/0370862 | A1 | 12/2018 | Kirby et al. |
| 2019/0048475 | A1* | 2/2019 | Ndamka ................ C23C 28/321 |
| 2020/0040746 | A1* | 2/2020 | Jackson ................. F01D 5/288 |
| 2020/0055788 | A1* | 2/2020 | Mikalsen .............. C04B 41/009 |
| 2020/0080430 | A1* | 3/2020 | Schmidt ............... C04B 35/5603 |
| 2020/0123071 | A1 | 4/2020 | Ndamka et al. |
| 2022/0048828 | A1 | 2/2022 | Liu et al. |

FOREIGN PATENT DOCUMENTS

| | | | | |
|---|---|---|---|---|
| EP | 1806431 | A2 | 7/2007 | |
| EP | 1900848 | A2 | 3/2008 | |
| EP | 2189504 | A1 | 5/2010 | |
| EP | 2192098 | A1 | 6/2010 | |
| EP | 2388354 | A1 | 11/2011 | |
| EP | 2615250 | A1 | 7/2013 | |
| EP | 2644747 | A1 | 10/2013 | |
| EP | 3409653 | A1 | 12/2015 | |
| EP | 3130577 | A1 | 2/2017 | |
| EP | 3162783 | A1 | 5/2017 | |
| EP | 3954806 | A1 * | 2/2022 | ........... C04B 41/009 |
| WO | 2013103425 | A2 | 7/2013 | |
| WO | 2014204480 | A1 | 12/2014 | |
| WO | 2017031163 | A1 | 2/2017 | |
| WO | WO-2019069023 | A1 * | 4/2019 | ........... C04B 41/009 |

OTHER PUBLICATIONS

F. Smeacetto et al. "Protective coatings for carbon-bonded carbon-fiber composites", Ceramics International 34 (2008), pp. 1297-1301) (Year: 2008).*

C. Levi at al. "Environmental degradation of thermal barrier coatings by molten deposits", MRS Bulletin 37 (2012) pp. 932-941. (Year: 2012).*

U.S. Non-Final Office Action dated Mar. 11, 2020 for corresponding U.S. Appl. No. 15/998,736.

(56) References Cited

OTHER PUBLICATIONS

U. Kolitsch, H.J. Seifert, and F. Aldinger, "Phase Relationships in the Systems RE2O3—Al2O3—SiO2 (RE=Rare Earth Element, Y, and Sc)" Journal of Phase Equilibria, vol. 19, No. 5, 1998.
U.S. Non-Final Office Action dated Oct. 31, 2019 issued in U.S. Appl. No. 15/998,736.
European Search Report dated Jan. 3, 2020 issued for corresponding European Patent Application No. 19192124.6.
U.S. Non-final Office action dated Sep. 10, 2020 issued for corresponding U.S. Appl. No. 14/711,902.
U.S. Notice of Allowance dated Nov. 2, 2010 issued for corresponding U.S. Appl. No. 15/998,736.
European Search Report dated Dec. 6, 2019 issued for corresponding European Patent Application No. 19189903.8.
European Search Report dated Jan. 7, 2020 issued for corresponding European Patent Application No. 19192131.1.
European Search Report dated Jan. 13, 2020 issued for corresponding European Patent Application No. 19192162.6.
Poerschke, D.L., et al., "Interaction of yttrium disilicate environmental barrier coatings with calcium-magnesium-iron aluminosllicate melts", Acta Materialia, vol. 145, Dec. 19, 2017 pp. 451-461.
Ahlborg, N.L., et al., "Calcium-magnesium aluminosilicate (CMAS) reactions and degradation mechanisms of advanced environmental barrier coatings", Surface & Coatings Technology, vol. 237, (2013) pp. 79-87.
Zhao, H., et al., "Molten silicate reactions with plasma sprayed ytterbium silicate coatings", Surface & Coatings Technology, vol. 288, Jan. 14, 2016, pp. 151-162.
U.S. Non-Final Office Action dated Jul. 17, 2019 issued in U.S. Appl. No. 15/998,736.
European Office action dated Mar. 7, 2018 issued for corresponding EP Patent Application No. 15168227.5.
Latka, et al. "Thermal diffusivity and conductivity of yttria stabilized zirconia coatings obtained by suspension plasma spraying", Surface & Coatings Technology 208 (2012), pp. 87-91, (Year 2012).
Fauchals, et al. "Understanding of Suspension DC Plasma Spraying of Finely Structured Coatings for SOFC", IEEE Transactions on Plasma Science, vol. 33, No. 2, Apr. 2005, pp. 920-930. (Year: 2005).
Qu, et al., "Thermal Conductivity of the gadolinium calcium silicate apatites: Effect of Different Point Defect Types", Acta Materialia vol. 59, (2011), pp. 3841-3850.
U.S. Non-final Office action dated Apr. 13, 2017 issued for corresponding U.S. Appl. No. 14/711,902.
U.S. Non-final Office action dated Aug. 1, 2019 issued for corresponding U.S. Appl. No. 14/711,902.
U.S. Final Office action dated Aug. 23, 2017 issued for corresponding U.S. Appl. No. 14/711,902.
U.S. Final Office action dated Dec. 11, 2019 issued for corresponding U.S. Appl. No. 14/711,902.
EP Search Report dated Sep. 28, 2015 issued for European Patent Application No. 15168227.5.
U.S. Non-Final Office Action dated Mar. 16, 2022 for corresponding U.S. Appl. No. 15/998,731.

* cited by examiner

SELF-HEALING ENVIRONMENTAL BARRIER COATING

BACKGROUND

The disclosure relates to an article comprising a substrate containing silicon and an environmental barrier coating (EBC) which functions as a protective environmental barrier coating and inhibits the formation of gaseous species of Si, particularly Si $(OH)_x$ when the article is exposed to a high temperature, steam-laden environment.

Ceramic materials containing silicon and metal alloys containing silicon have been proposed for structures used in high temperature applications as, for example, gas turbine engines, heat exchangers, internal combustion engines, and the like. A particular useful application for these materials is for use in gas turbine engines which operate at high temperatures in steam-laden environments.

It has been found that these silicon containing structures can recess and lose mass as a result of formation of volatile silicon species, particularly $Si(OH)_x$ and SiO when exposed to high temperature, steam-laden environments.

It is believed that the process involves oxidation of the silicon containing structure to form silica on the surface followed by reaction of the silica with steam to form volatile species of silicon such as $Si(OH)_x$. Naturally it would be highly desirable to provide an external barrier coating for silicon containing substrates which would inhibit the formation of volatile silicon species, $Si(OH)_x$ and SiO, and thereby reduce recession and mass loss.

SUMMARY

In accordance with the present disclosure, there is provided an environmental barrier coating, comprising a substrate containing silicon; an environmental barrier layer applied to the substrate; the environmental barrier layer comprising an oxide matrix; an oxidant getter phase interspersed throughout the oxide matrix; and a self-healing phase interspersed throughout the oxide matrix.

In another and alternative embodiment, the substrate comprises a ceramic matrix composite material.

In another and alternative embodiment, the environmental barrier layer comprises a $SiO_2$ rich phase.

In another and alternative embodiment, the self-healing phase comprises a glass phase.

In another and alternative embodiment, the oxidant getter phase comprises $Si_xO_yC_z$ where $0.5 \leq x < 1$; $0 \leq y < 2$; $0 \leq z < 2$.

In another and alternative embodiment, the self-healing phase comprises a material having properties of being in thermodynamic equilibrium with $SiO_2$ during operation at predetermined temperatures.

In another and alternative embodiment, the self-healing phase comprises a material having properties of flowing into cracks formed in the matrix during operation at predetermined temperatures.

In another and alternative embodiment, the self-healing phase comprises a material having properties of flowing into cracks formed in the matrix during operation at predetermined temperatures of from 1800 (982° C.)-3000 degrees Fahrenheit (1650° C.)

In another and alternative embodiment, the substrate comprises at least one of a turbine vane and a turbine blade.

In another and alternative embodiment, the environmental barrier coating further comprises a protective layer applied on the environmental barrier coating.

Other details of the coating are set forth in the following detailed description and the accompanying drawings wherein like reference numerals depict like elements.

DETAILED DESCRIPTION

Figure 1:
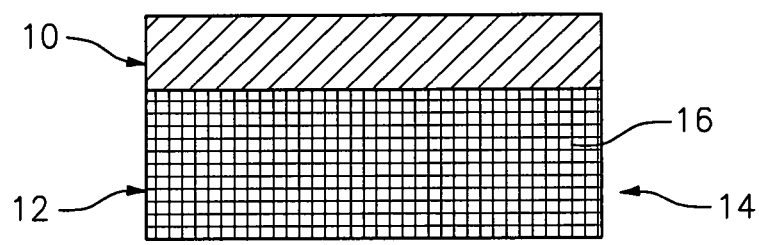
FIG. 1 is a cross section of an exemplary coating on a substrate containing silicon according to the disclosure.

Referring now to FIG. 1, there is illustrated an environmental barrier coating 10 formed over a substrate 12 of an article 14, configured to inhibit the formation of gaseous species of silicon when the article 14 is exposed to a high temperature, steam-laden environment. The substrate 12 can be associated with articles 14 such as, at least one of a turbine vane and a turbine blade, and particularly a gas turbine engine component, such as components in the hot section of the gas turbine engine, including static and rotating components and portions of combustors, and the like.

The substrate 12 can be constructed from materials containing silicon and can be a ceramic matrix composite material, a monolithic ceramic, a silicon-based or silicon containing ceramic substrate or a silicon containing metal alloy. In an exemplary embodiment, the substrate 12 can be silicon containing ceramic material such as, for example, silicon carbide, silicon nitride, silicon oxy-nitride and silicon aluminum oxy-nitride, alkaline earth or rare earth silicate glasses or glass ceramics and combinations thereof. Examples can include barium strontium alumino silicate, strontium alumino silicate, lithium alumino silicate, aluminosilicate, mullite, yttrium silicate, ytterbium silicate, and the like. In accordance with a particular embodiment, the silicon containing ceramic substrate comprises a silicon containing matrix with reinforcing materials 16 such as fibers, particles and the like and, more particularly, a silicon based matrix which is fiber-reinforced. Particularly suitable ceramic substrates are a silicon carbide fiber-reinforced silicon carbide matrix, a carbon fiber-reinforced silicon carbide matrix and a silicon carbide fiber-reinforced silicon nitride matrix. Particularly useful silicon-metal alloys for use as substrates for the article 14 can include molybdenum-silicon alloys, niobium-silicon alloys, iron-silicon alloys, and alloys of zirconium, hafnium, titanium, chromium, tungsten, boron, platinum, and tantalum.

Figure 2:
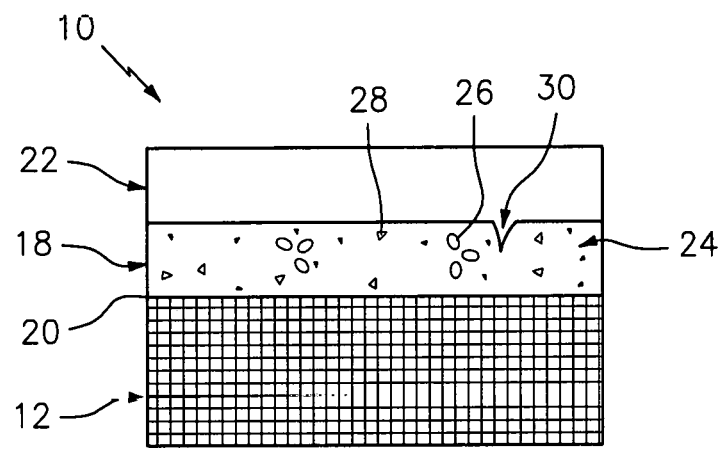
FIG. 2 is a cross section of an exemplary coating on a substrate containing silicon according to the disclosure.

Referring also to FIG. 2, an environmental barrier layer 18 can be applied to the substrate 12 on a surface 20. A protective layer 22 can be applied on the environmental barrier layer 18. The protective layer 22 is configured to resist recession of the Si-containing volatile species when exposed to water vapor or steam. In an exemplary embodiment, the protective layer 22 can include binary or multi-component oxides such as $HfO_2$, $ZrO_2$, or $Gd_2Hf_2O_7$, $Gd_2Zr_2O_7$, refractory metal oxides. In other exemplary embodiments, the protective layer 22 can include silicates with low(er) $SiO_2$ activities. In another exemplary embodiment the protective layer 22 can include (rare earth) RE-monosilicates, disilicates and (alkaline earth) AE alumino silicates, silicates of Hafnium and zirconium.

The environmental barrier layer 18 can include an oxide matrix 24 and an oxidant getter phase 26 interspersed throughout the oxide matrix 24. The oxide matrix 24 can include a multi-phase mixture, such as $SiO_2$ rich phase and a self-healing phase 28 that can include a glass phase.

In an exemplary embodiment, the composition of the self-healing phase can include 15% CaO, 10% $AlO_{1.5}$, 75% $SiO_2$. The thermodynamically equilibrated phase constitution of this composition is shown in FIG. 3.

Another exemplary embodiment is 10% CaO, 5% $AlO_{1.5}$, 85% $SiO_2$. The thermodynamically equilibrated phase constitution of this composition is shown in FIG. 4.

Figure 3C:
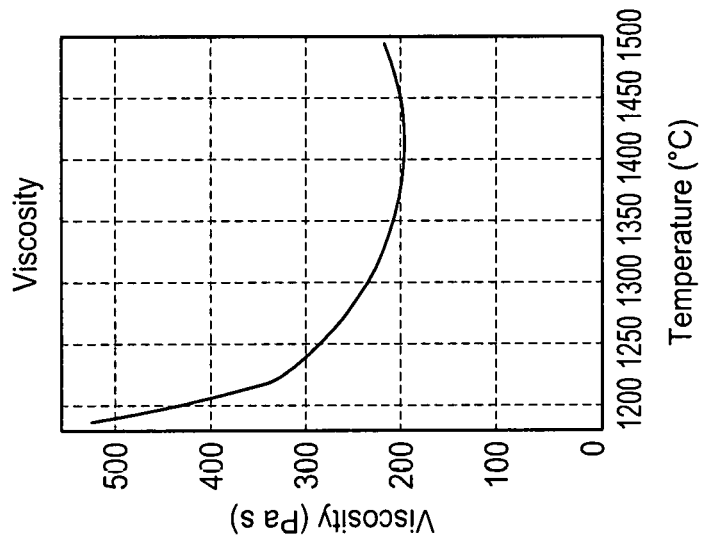
FIGS. 3a-3c illustrate diagrams of an exemplary composition.
Figure 3B:
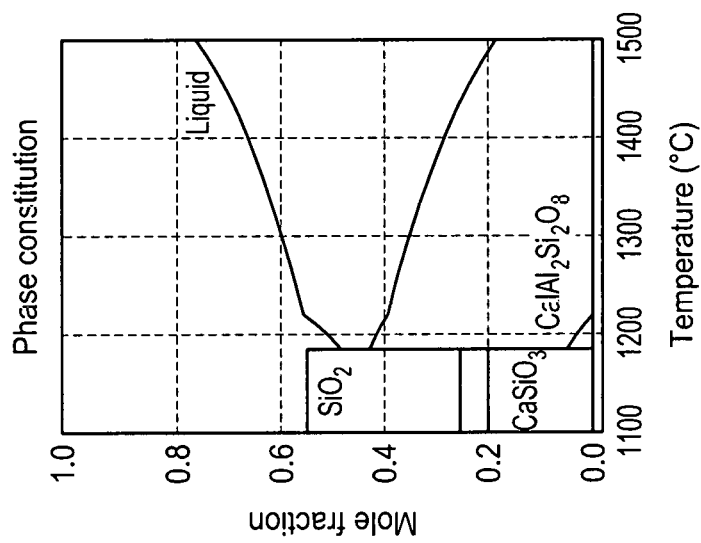
Figure 3A:
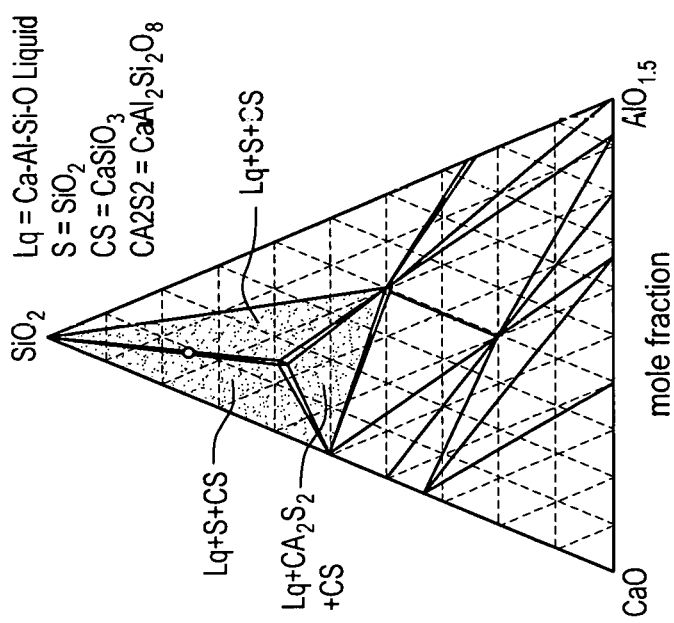
Figure 4C:
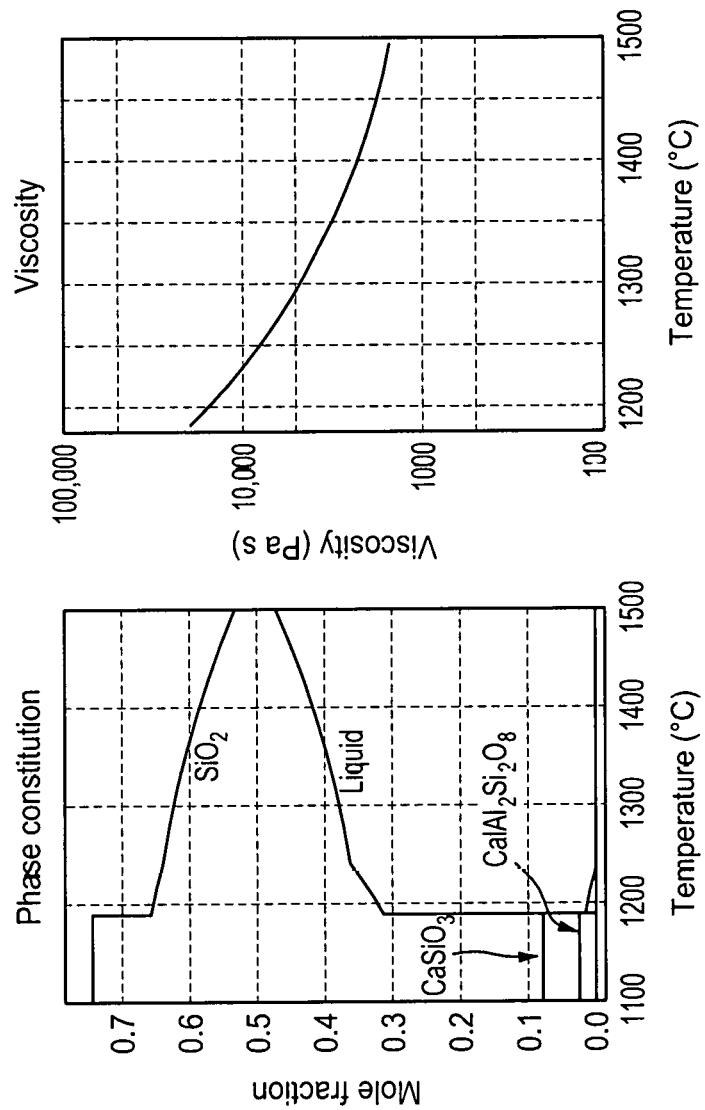
FIGS. 4a-4c illustrate diagrams of an exemplary composition.
Figure 4B:
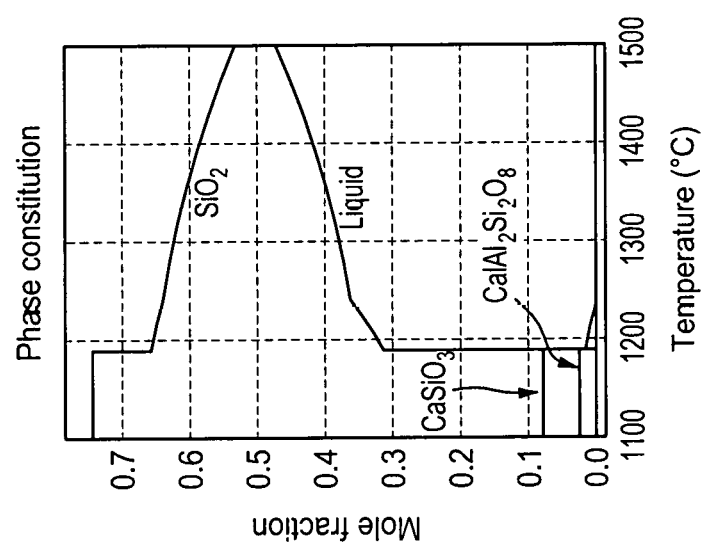
Figure 4A:
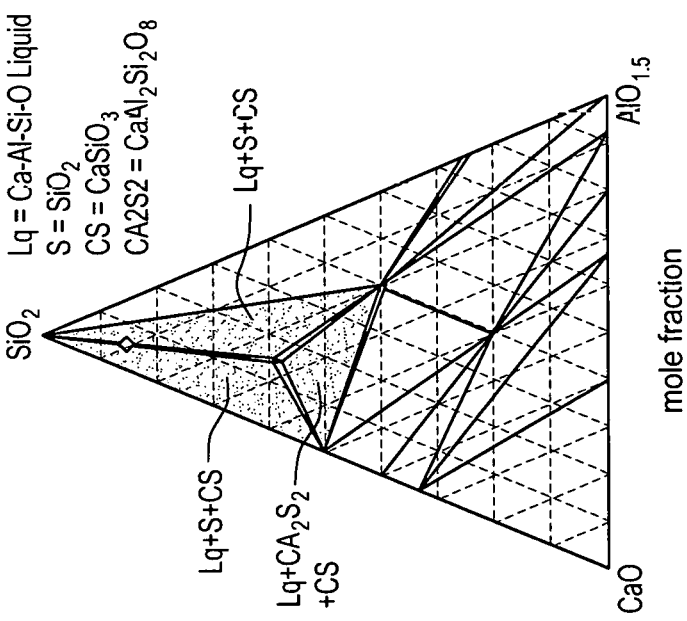
Figure 5C:
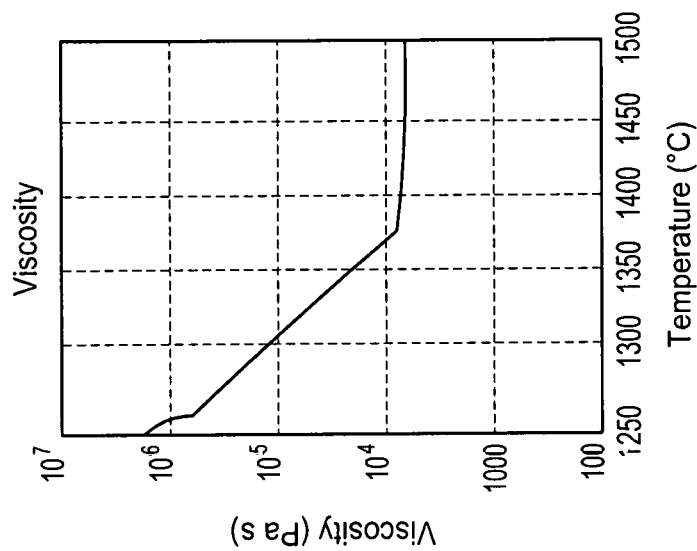
FIGS. 5a-5c illustrate diagrams of an exemplary composition.
Figure 5B:
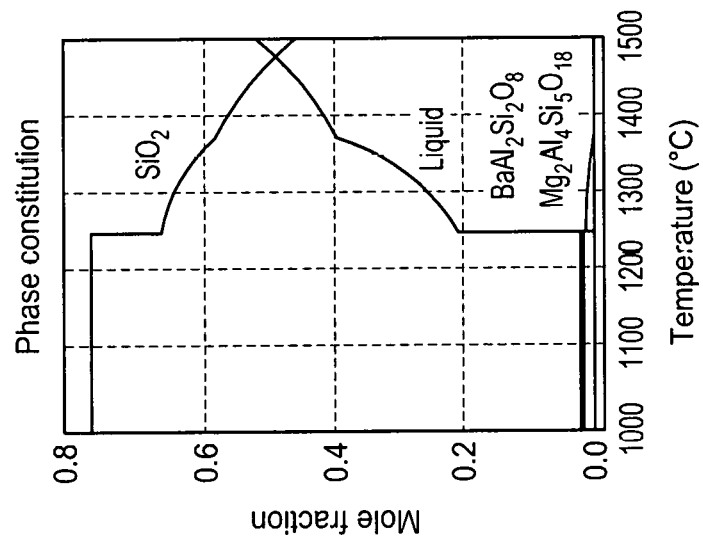
Figure 5A:
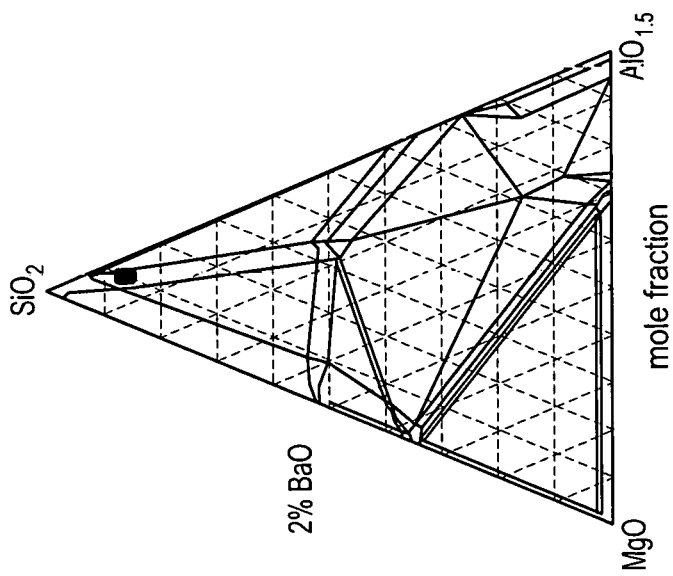
Figure 6:
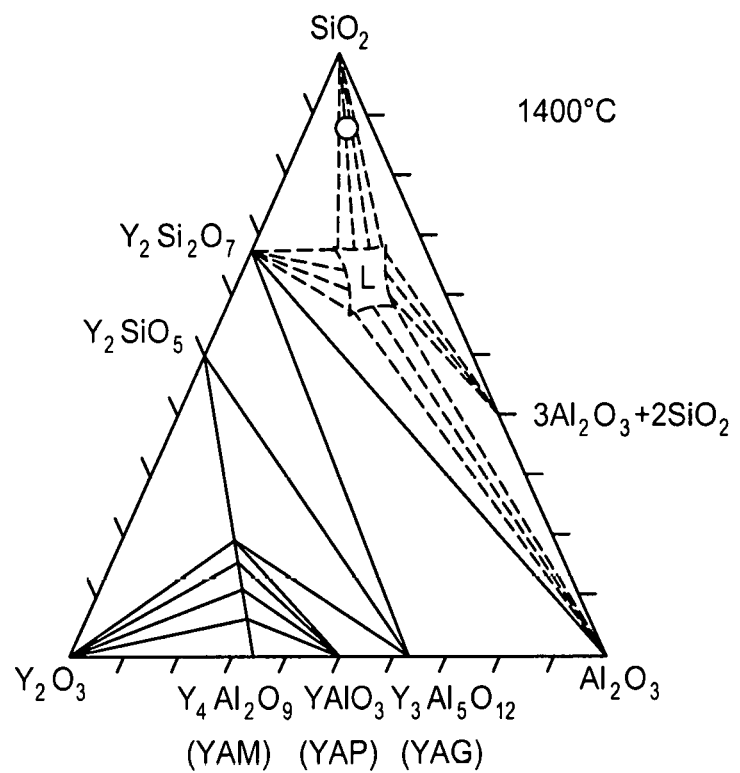
FIG. 6 illustrates a diagram of an exemplary composition.

In an exemplary embodiment, the composition of the oxide matrix 24 dictates the mole fraction of the glass and the $SiO_2$. The self-healing phase 28 can include a material having properties that are in thermodynamic equilibrium with $SiO_2$ during operation at predetermined temperatures. The self-healing phase 28 comprises a material having properties of flowing into cracks 30 formed in the matrix 24 during operation at those predetermined temperatures. The self-healing phase 28 can be sufficiently fluid at high temperatures to flow into the cracks 30 in the coating 10, which imparts a self-healing functionality. In an exemplary embodiment, the self-healing phase 28 can include doped silicates, compatible metals/metal alloys, non-oxide glasses, the $SiO_2$ itself, as well as any representative glass/glass ceramics such as barium alumino silicate (BAS), barium-magnesium alumino silicate (BMAS), lithium alumino silicate (LAS), strontium alumino silicate (SAS). In another exemplary embodiment, the volume fraction and viscosity of the self-healing liquid phase is shown in FIGS. 3-6. FIGS. 3a-3c show the diagram for the composition of 15 CaO, 10 $AlO_{1.5}$-75 $SiO_2$. FIGS. 4a-4c show the diagram for the composition 10 CaO, 5 $AlO_{1.5}$-85 $SiO_2$. FIGS. 5a-5c shows the diagram for the composition 2 BaO, 3 MgO, 10 $AlO_{1.5}$-85 $SiO_2$. FIG. 6 shows the diagram for the composition 7 $YO_{1.5}$, 13$AlO_{1.5}$-80$SiO_2$.

In an exemplary embodiment the oxidant getter phase can comprise, silicon oxycarbide, $Si_xO_yC_z$ where $0.5 \le x < 1$; $0 \le y < 2$; $0 \le z < 2$.

FIGS. 3a-3c and 4a-4c show thermodynamic calculations describing the CaO—$AlO_{1.5}$—$SiO_2$ (CAS) system. Two preferred embodiments of the self-healing matrix are considered in detail, 15 CaO, 10 $AlO_{1.5}$-75 $SiO_2$ and 10 CaO, 5 $AlO_{1.5}$-85 $SiO_2$. In an exemplary temperature range these compositions are 30-80% liquid phase. These calculations demonstrate that the volume fraction of liquid can be varied through changes of composition in the CaO—$AlO_{1.5}$—$SiO_2$ in the range 1-25% CaO, 1-25% $AlO_{1.5}$, 50-99% $SiO_2$. The viscosity of the liquid phase is generally greater than 100 Pa*s.

With reference to chemical databases such as 'Phase diagram for Ceramists' Levin, E. M., C. R. Robbins, and H. F. McMurdie. "Phase Diagrams for Ceramists (The American Ceramic Society, Columbus, 1964). or through the use of the software FactSage™ it is understood that other alkaline earth-alumina silica systems, such as MgO—$AlO_{1.5}$—$SiO_2$, BaO—$AlO_{1.5}$—$SiO_2$, SrO—$AlO_{1.5}$—$SiO_2$ have a eutectic composition in $SiO_2$ rich portion of the phase diagram and compositional ranges in which liquid+$SiO_2$ are the equilibrium phases. The $SiO_2$-liquid equilibria results in the formation of a liquid with viscosity greater than 100 Pa*s which simultaneously enables self-healing of cracks 30 without compromising mechanical integrity of the environmental barrier layer 18.

Within the above specified composition range, in exemplary cases greater than 2 phases will be in thermodynamic equilibrium. For example, in the CAS system the composition 10 CaO, 10 $AlO_{1.5}$-80 $SiO_2$, liquid —$SiO_2$ and $CaAl_2Si_2O_8$ (anorthite) will be in equilibrium at temperatures greater than 1185° C. The presence of anorthite does not interfere with the effect that the $SiO_2$-liquid equilibrium has on maintaining the viscosity of the liquid at the desired level of greater than 100 Pa*s.

FIGS. 5a-5c show thermodynamic calculations in the BaO—MgO—$AlO_{1.5}$—$SiO_2$ system. A preferred embodiment of this system is 2 BaO, 3 MgO, 10 $AlO_{1.5}$-85 $SiO_2$ and is described in detail in FIGS. 5a-5c. Similar to the CAS system a liquid+$SiO_2$ phase field exists, in this case $BaAl_2Si_2O_8$ and $Mg_2Al_4Si_5O_{18}$ and possibly $BaMg_2Al_6Si_9O_{30}$ are in equilibrium. The key feature is a liquid phase that is equilibrated with $SiO_2$ that has a viscosity of greater than 100 Pa*s.

It can also be understood that other combinations of alkaline earth-alumina silicates in which the total alkaline earth (AE) concentration is between 1-25% AE, the 1-25 $AlO_{1.5}$, and 50-99% $SiO_2$ will form a similar distribution of phases.

FIG. 6 shows thermodynamic calculations in the $YO_{1.5}$—$AlO_{1.5}$—$SiO_2$ (YAS) system. An exemplary embodiment of this system is 7 $YO_{1.5}$, 13 $AlO_{1.5}$-80 $SiO_2$ and is described in detail in FIG. 6. In the desired temperature range a Y—Al—Si—O liquid is in equilibrium with $SiO_2$.

The work of U. Kolitsch, H. J. Seifert, and F. Aldinger 1998 can be referenced for one to see that other rare earth, $AlO_{1.5}$—$SiO_2$ systems have silica rich eutectics that are in equilibrium with $SiO_2$. For ra viscosity greater than 100 Pa*s re earths such as La, Gd, Nd, Sm, and the like.

The environmental barrier layer 18 can be present on the substrate 12 at a thickness of greater than or equal to about 0.5 mils (0.0005 inch), preferably between about 3 to about 30 mils and ideally between about 3 to about 5 mils.

The environmental barrier layer 18 can be applied by preparing a surface 20 of the substrate 14. The environmental barrier layer 18 can be applied to the substrate 12 by use of thermal spray methods, including air plasma spray, suspension plasma spray, low pressure or vacuum plasma spray, high velocity oxygen or air fuel spraying, and flame spraying, or, vapor deposition, including, atomic layer deposition, chemical vapor deposition, or electron-beam physical vapor deposition. In alternative embodiments, the environmental barrier layer 18 can be applied by slurry based methods including dip or spray coating, painting, electrophoretic deposition and the like.

An advantage of utilizing the disclosed environmental barrier coating 10 is that the coating composition offers a robust composition for protecting components in the hot-section of gas turbine engines. The disclosed compositions form a multiphase matrix that consists of a liquid phase and silica at elevated temperatures. The compositions can be varied to create coatings with different properties for a desired application.

There has been provided a protective coating. While the coating has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An environmental barrier coating system, comprising:
   a substrate containing silicon;
   an environmental barrier layer applied to said substrate; said environmental barrier layer comprising an oxide matrix;
   an oxidant getter phase interspersed throughout said oxide matrix; and
   a self-healing phase interspersed throughout said oxide matrix; wherein said self-healing phase comprises a composition of $CaO\text{-}AlO_{1.5}\text{-}SiO_2$ in the ranges 1-25 mol % CaO, 1-25 mol % $AlO_{1.5}$, 50-99 mol % $SiO_2$.

2. The environmental barrier coating system of claim 1, wherein said substrate comprises a ceramic matrix composite material.

3. The environmental barrier coating system of claim 1, wherein said environmental barrier layer comprises a $SiO_2$ rich phase.

4. The environmental barrier coating system of claim 1, wherein said self-healing phase comprises a glass phase.

5. The environmental barrier coating system of claim 1, wherein said oxidant getter phase comprises $Si_xO_yC_z$ where $0.5 \leq x < 1$; $0 \leq y < 2$; $0 \leq z < 2$.

6. The environmental barrier coating system of claim 1, wherein said self-healing phase comprises a material having properties of being in thermodynamic equilibrium with a $SiO_2$ during operation at predetermined temperatures.

7. The environmental barrier coating system of claim 1, wherein said self-healing phase comprises a material having properties of flowing into cracks formed in said oxide matrix during operation at predetermined temperatures.

8. The environmental barrier coating system of claim 1, wherein said self-healing phase comprises a material having properties of flowing into cracks formed in said oxide matrix during operation at predetermined temperatures of from 1800 (982° C.) -3000 degrees Fahrenheit (1650° C.).

9. The environmental barrier coating system of claim 1, wherein said substrate comprises at least one of a turbine vane and a turbine blade.

10. The environmental barrier coating system of claim 1, further comprising:
    a protective layer applied on said environmental barrier layer.

11. An environmental barrier coating system, comprising:
    a substrate containing silicon;
    an environmental barrier layer applied to said substrate; said environmental barrier layer comprising an oxide matrix;
    an oxidant getter phase interspersed throughout said oxide matrix; and
    a self-healing phase interspersed throughout said oxide matrix; wherein said self-healing phase comprises a composition of alkaline earth-alumino silicates in which the total alkaline earth (AE) concentration is between 1-25% AE, 1-25mol % $AlO_{1.5}$, and 50-99mol % $SiO_2$.

* * * * *